US009103656B2

(12) United States Patent
Matsumiya et al.

(10) Patent No.: US 9,103,656 B2
(45) Date of Patent: Aug. 11, 2015

(54) METHOD FOR CLEANING SKID OF SURFACE ROUGHNESS TESTER

(75) Inventors: Sadayuki Matsumiya, Kawasaki (JP); Nobuyuki Hama, Kure (JP)

(73) Assignee: MITUTOYO CORPORATION, Kawasaki-Shi (JP)

( * ) Notice: Subject to any disclaimer, the term of this patent is extended or adjusted under 35 U.S.C. 154(b) by 388 days.

(21) Appl. No.: 13/178,792

(22) Filed: Jul. 8, 2011

(65) Prior Publication Data

US 2012/0017940 A1 Jan. 26, 2012

(30) Foreign Application Priority Data

Jul. 20, 2010 (JP) ................................ 2010-162437

(51) Int. Cl.
*G01B 5/28* (2006.01)
*B08B 1/00* (2006.01)
*B08B 5/04* (2006.01)
*B08B 3/12* (2006.01)

(52) U.S. Cl.
CPC ... *G01B 5/28* (2013.01); *B08B 1/00* (2013.01); *B08B 3/12* (2013.01); *B08B 5/04* (2013.01)

(58) Field of Classification Search
CPC .............. G01B 5/28; B08B 1/00; B08B 3/12; B08B 5/04
USPC .................... 134/1, 6, 21, 22.1, 22.18, 34, 37
See application file for complete search history.

(56) References Cited

U.S. PATENT DOCUMENTS 2,260,016 A * 10/1941 Fink .............................. 451/259
3,031,195 A * 4/1962 Lunsford ........................ 369/71
4,106,333 A * 8/1978 Salje et al. ...................... 73/105
4,553,871 A * 11/1985 Niles ............................. 401/195
2003/0171079 A1* 9/2003 How et al. ....................... 451/53
2008/0121030 A1 5/2008 Dorrer et al.

FOREIGN PATENT DOCUMENTS

CN 2717548 Y 8/2005
CN 1721092 1/2006
CN 1736622 A 2/2006
JP 62-194401 8/1987
JP 03-164264 7/1991
JP 2006-090945 4/2006
JP 2009-503461 1/2009
RU 2262995 C2 10/2005

OTHER PUBLICATIONS

Extended European Search Report, Application No. 11005370.9, dated Nov. 29, 2011, five pages.

(Continued)

*Primary Examiner* — Alexander Markoff
(74) *Attorney, Agent, or Firm* — Rankin, Hill & Clark LLP

(57) ABSTRACT

A method for cleaning a skid of a surface roughness tester including the skid provided with a skid aperture in a vertical direction, and a stylus disposed in the skid aperture of the skid and capable of moving in the vertical direction, wherein the surface roughness tester measures surface roughness of an object by moving the skid along a surface of the object. The method includes removing a foreign substance existing in a gap between the skid aperture and the stylus after measuring the surface roughness of the object.

2 Claims, 8 Drawing Sheets

(56) References Cited

OTHER PUBLICATIONS

Japanese Office Action dated Jan. 28, 2014 with English Translation, 4 pages.
Chinese Office Action dated Dec. 4, 2013 with English translation, 12 pages.
Chinese Office Action and English Translation dated Jul. 23, 2014, 13 pages.

Japanese Office Action and English translation dated Jul. 1, 2014, 5 pages.

* cited by examiner

METHOD FOR CLEANING SKID OF SURFACE ROUGHNESS TESTER

BACKGROUND OF THE INVENTION

1. Field of the Invention

The present invention relates to a method for cleaning a skid of a surface roughness tester.

2. Description of the Related Art

The measurement of the surface roughness of machined work is important in the process management of the ascertainment of the quality of a machining condition, tool wear, a damage situation, and the like. In recent years, the needs of performing the measurement of the surface roughness of work on a working machine have accordingly increased in order to prevent the outflow of inferior work by judging the quality of the process management as soon as work is machined.

For these needs, a surface roughness tester is known as one suitable for performing the measurement of the surface roughness of machined work on the working machine of the work (see, for example, Japanese Patent Publication No. Hei 4-60523). The surface roughness tester moves a stylus while making the stylus be following the surface of an object to electrically detect and amplify the displacement quantity of the stylus, and the surface roughness tester thereby measures the surface roughness of the object.

To put it concretely, the surface roughness tester is equipped with a detector for measuring the surface roughness of an object, and a skid provided with an aperture, in which a stylus is arranged, and being situated at the end of the detector. The under surface (work contacting surface) of the skid contacts with an object (work) at the time of measurement. The stylus is configured to be capable of moving in the aperture of the skid at the time of measurement in order to be capable of coping with the inclination quantity of the surface of the object as much as possible.

Because the surface roughness tester has such a configuration, the surface roughness tester can perform the measurement by following the irregularities of the surface of an object, and consequently the surface roughness tester hardly receives the influences of external vibrations. Moreover, the surface roughness tester has an advantage of not requiring the strictness of the location of the tester and an object and the posture restriction of the tester.

However, generally, a foreign substance, such as a coolant, adheres to the surface of machined work. Consequently, there is a problem in which, when measurement of surface roughness is performed by moving a stylus to follow the surface of an object to which surface foreign substances adhere, as shown in FIG. 8, a foreign substance F enters a gap between the skid aperture 12*a* of a skid 12 and the stylus 13, and adheres thereto, and thereby the performance of measurement may decline.

SUMMARY OF THE INVENTION

It is an object of the present invention to provide a method for cleaning a skid of a surface roughness tester that can prevent the adherence of a foreign substance to a gap between the aperture of the skid and a stylus.

A first aspect of the present invention is a method for cleaning a skid of a surface roughness tester including the skid provided with a skid aperture in a vertical direction, and a stylus disposed in the skid aperture of the skid and capable of moving in the vertical direction, wherein the surface roughness tester measures surface roughness of an object by moving the skid along a surface of the object, the method includes removing a foreign substance existing in a gap between the skid aperture and the stylus after measuring the surface roughness of the object.

Moreover, a second aspect of the present invention is the method according to the first aspect, wherein the removing includes at least one of: attracting the skid by a suction pad contacted with an under surface of the skid; jetting compressed air for cleaning to the gap; and transmitting an ultrasonic wave to the gap through a cleaning fluid in which the skid is soaked.

BRIEF DESCRIPTION OF THE DRAWINGS

Although the present invention would further fully be understood by the following detailed description and the accompanying drawings, these are only for description, and the scope of the present invention is not limited to those ones, in which drawings.

DETAILED DESCRIPTION OF THE PREFERRED EMBODIMENTS

In the following, embodiments of the present invention will be described with reference to the accompanying drawings.

(First Embodiment)

The configuration of a surface roughness tester pertaining to the present invention will first be described.

Figure 1:
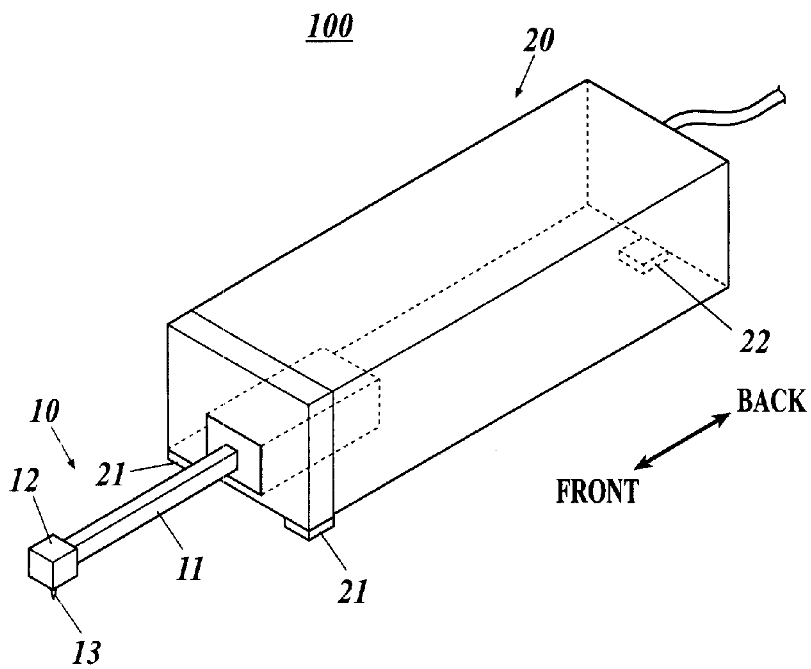
FIG. 1 is a schematic view of a surface roughness tester according to an embodiment of the present invention.

A surface roughness tester 100, as shown in FIG. 1, includes a detection section 10, a drive section 20, and the like.

The detection section 10 moves on an object to be measured by a drive of the drive section 20 into the front-back direction to detect the surface roughness (small surface irregularities) of the object with the stylus 13.

Figure 2:
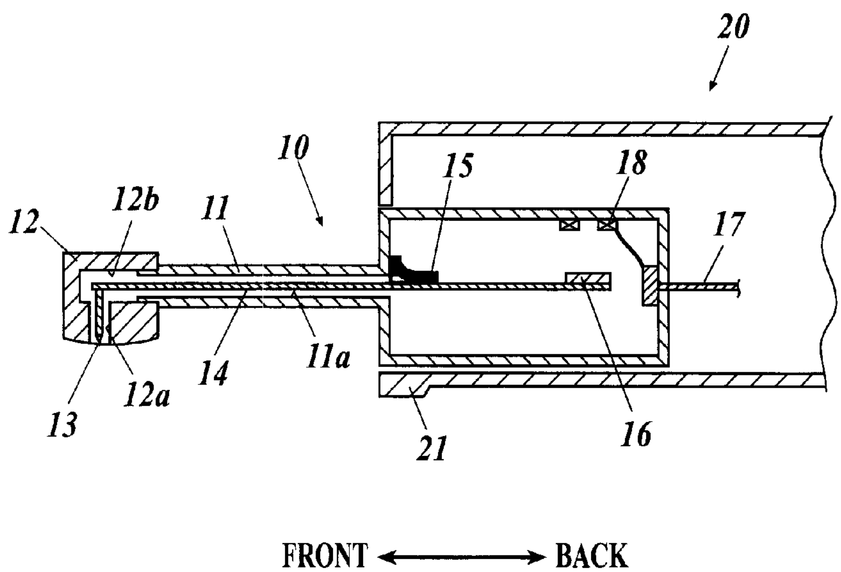
FIG. 2 is a sectional view showing a detection section of the surface roughness tester of FIG. 1.
Figure 3:
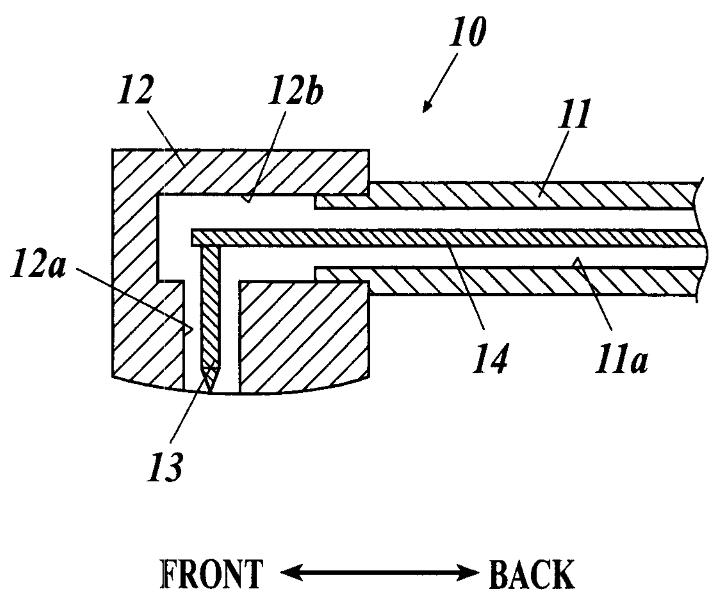
FIG. 3 is an enlarged view of a principal part showing an end of the detection section of FIG. 2.

To put it concretely, as shown in FIGS. 2 and 3, the detection section 10 includes a detection section case 11 projecting from the front end part of the drive section 20. A cavity 11*a* is formed in the detection section case 11. The skid 12 is provided at the end of the detection section case 11.

A cavity 12*b* is formed in the skid 12 from the back end part thereof into the front direction. The cavity 12*b* is connected to the cavity 11*a* of the detection section case 11 in the state in which the skid 12 is attached to the end of the detection section case 11. Moreover, a skid aperture 12*a* is formed in the skid 12 from the under surface of the skid 12. The skid aperture 12*a* connects with the cavity 12*b* . A stylus lever 14 is arranged from the back of the cavity 11*a* of the detection section case 11 to the cavity 12*b*.

The stylus lever 14 is equipped with the stylus 13 facing downward at the end of the stylus lever 14 The stylus 13 is arranged in the skid aperture 12*a*.

A ferrite plate 16 is attached onto the upper surface of the stylus lever 14 at the back end thereof. An inductance detector 18 connected to a connector pin 17 is attached to the detection section case 11 at a position thereof opposed to the ferrite plate 16.

The stylus lever 14 is attached to the detection section case 11 at an intermediate part thereof with a leaf spring 15. The leaf spring 15 resiliently supports the stylus lever 14 as its fulcrum, and whereby the stylus 13 and the ferrite plate 16 are balanced in the state in which the stylus 13 slightly projects from the under surface of the skid 12. The under surface of the skid 12 is a work contacting surface contacting with an object at the time of measurement. When the under surface of the skid 12 moves along the surface of a measurement region of the object, the stylus 13 vertically moves up and down in accordance with the surface roughness of the measurement region. When the stylus 13 moves upwards, the ferrite plate 16 moves downwards by the stylus lever 14, centering on the leaf spring 15 as the fulcrum. When the stylus 13 moves downwards, the ferrite plate 16 moves upwards by the stylus lever 14, centering on the leaf spring 15 as the fulcrum. The vertical motion of the ferrite plate 16 is detected by the inductance detector 18, and the surface roughness of the object is measured on the basis of a detection signal output from the inductance detector 18 and the horizontal movement distance of the stylus 13.

The drive section 20 resiliently holds the detection section 10 and moves the detection section 10 into a given direction (front-back direction) with a not-shown control mechanism.

Two leg sections 21 are provided on both the sides of the bottom surface of the drive section 20 in the front end part, respectively, and a leg section 22 is provided at the center of the bottom surface thereof in the back end part. The heights of the two leg sections 21 can be regulated independently. The surface roughness tester 100 is configured to be capable of being stably placed with the three leg sections 21 and 22 no matter what shape the installation place thereof has. The surface roughness tester 100 can consequently be placed on not only an object that has a planar surface shape but also an object that has, for example, a curved surface shape.

Next, a method for cleaning the skid 12 of the surface roughness tester 100 described above will be described.

Skid cleaning processing is performed after measurement of surface roughness by the surface roughness tester 100.

The "after measurement" here indicates, "on or after the timing" at which measurement of one position of an object ends, when one position of an object is measured.

Moreover, when a plurality of positions of an object is measured, the skid cleaning processing may be performed on or after the timing at which a series of measurement of a plurality of positions ends as the "after measurement", or maybe performed on or after every timing at which, among the plurality of positions, measurement of one position or a series of measurement of a plurality of positions ends as the "after measurement".

In either case described above, it is preferable to perform the skid cleaning processing just after measurement in order to obtain a higher cleaning effect. Moreover, for example, when the surface roughness tester 100 is usually housed and kept in a predetermined housing place except a measurement time, the skid cleaning processing should be performed at least before housing the surface roughness tester 100 after measurement.

Thereby, even when a surface of an object such as machined work to which a foreign substance such as a coolant adheres is measured and a foreign substance F enters the gap between the skid aperture 12*a* and the stylus 13, the foreign substance F can be removed quickly before the adherence thereof to the gap.

Figure 4:
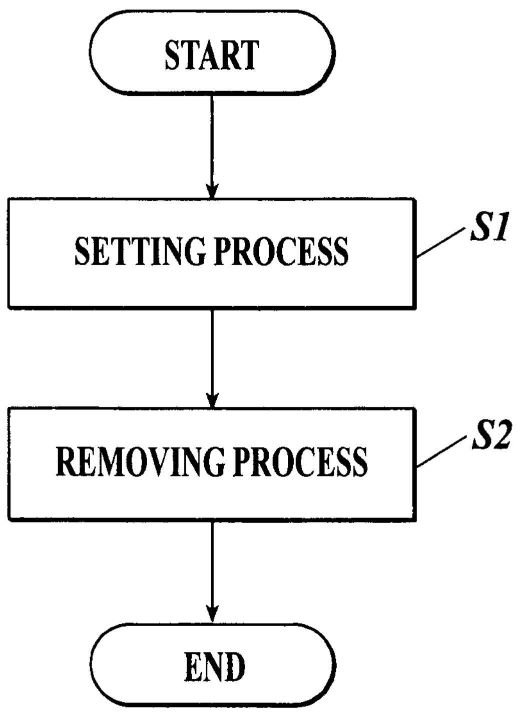
FIG. 4 is a flowchart showing a method for cleaning a skid according to an embodiment of the present invention.

The method for cleaning a skid, as shown in FIG. 4, includes a setting process (S1) of installing a foreign substance removing section (described below) at a predetermined position of the skid 12 of the surface roughness tester 100 and a removing process (S2) of removing the foreign substance F in the gap between the skid aperture 12*a* and the stylus 13 therefrom.

The foreign substance removing section used for the method for cleaning a skid shown in FIG. 4 will be described here.

Figure 5:
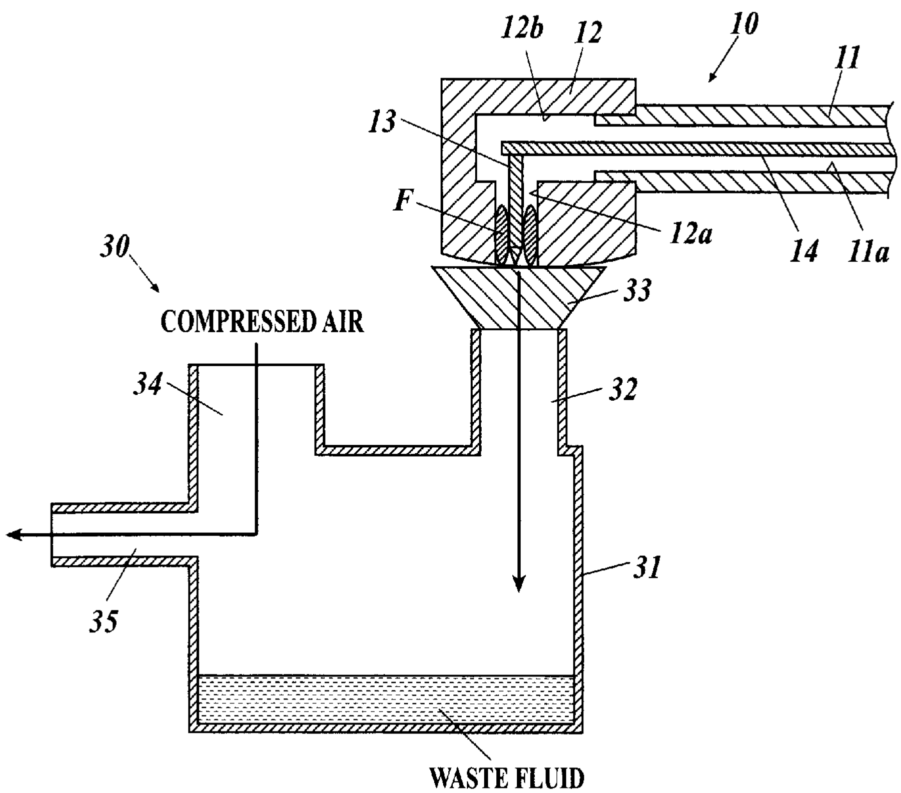
FIG. 5 is a schematic view of a foreign substance removing section of a first embodiment.

The foreign substance removing section of the present embodiment is, as shown in FIG. 5, a suction device (aspirator) 30 making a suction pad 33 touch the under surface of the skid 12 and making the suction pad 33 attract the skid 12 to remove the foreign substance F in the gap by suction.

To put it concretely, the aspirator 30 includes the suction pad 33 to touch the under surface of the skid 12 and a tank section 31 connected to the suction pad 33.

A connection port 32 is formed on the upper surface of the tank section 31, and the suction pad 33 is provided at the upper end of the connection port 32. As the materials of the suction pad 33, air-permeable materials such as cloth woven from natural fibers or synthetic fibers, a porous polymer film, nonwoven fabric, and paper can be listed.

The suction pad 33 deforms along the shape of the under surface of the skid 12 when the under surface of the skid 12 is pushed on the suction pad 33. Moreover, the suction pad 33 can appropriately be exchanged according to the blotted state thereof.

Moreover, the tank section 31 is equipped with a compressed air intake 34 and a compressed air outlet 35. The aspirator 30 ejects the air inside the tank section 31 by the Venturi effect of taking compressed air into the tank section 31 through the compressed air intake 34 and jetting the compressed air through the compressed air outlet 35 at the time of the skid cleaning processing. A negative pressure is thereby applied on the suction pad 33 to attract the skid aperture 12*a*.

Consequently, in the present embodiment, at the setting process (S1), after measurement of an object by the surface roughness tester 100 has ended, the aspirator 30 is installed in such a way that the suction pad 33 touches the end of the stylus 13 and the under surface of the skid 12 of the surface roughness tester 100.

Incidentally, the setting process (S1) may automatically be performed after measurement, or may manually be performed by an operator.

Moreover, at the removing process (S2), the air inside the tank section 31 is evacuated by operating the aspirator 30 in the state in which the suction pad 33 touches the end of the stylus 13 and the under surface of the skid 12. Then, when the air inside the tank section 31 is evacuated, a negative pressure is thereby applied to the suction pad 33, and the air in the skid 12 is suctioned through the skid aperture 12*a*. By this suction force, the foreign substance F in the gap between the skid aperture 12*a* and the stylus 13 is suctioned.

That is, by this suction force, the foreign substance F including a fluid coolant existing in the gap, a coolant component dried to be separated out on the surface of the stylus 13, a solid-formed or semisolid-formed coolant adhering to the surface of the stylus 13, and the like is suctioned and removed. At this time, the dried coolant component, the solid-formed or semisolid-formed coolant taken out from the gap remains on the suction pad 33, which is operated as a filter, and the fluid coolant drops into the tank section 31 and is reserved therein as a waste fluid.

Incidentally, after the cleaning is performed by suctioning the foreign substance F in the gap between the skid aperture 12*a* and the stylus 13 in such a way, the aspirator 30 is separated from the detection section 10.

As described above, according to the method for cleaning the skid 12 of the surface roughness tester 100 including the skid 12 provided with the skid aperture 12*a* in the vertical direction, and the stylus 13 disposed in the skid aperture 12*a* of the skid 12 and capable of moving in the vertical direction, wherein the surface roughness tester 100 measures the surface roughness of an object by moving the skid 12 along the surface of the object, and hence the foreign substance F existing in a gap between the skid aperture 12*a* and the stylus 13 can be removed after measuring the surface roughness of the object.

Consequently, even when the surface roughness tester 100 measures an object to which the foreign substance F adheres, the gap between the skid aperture 12*a* and the stylus 13 is prevented from being blocked by adherence or solidification of the foreign substance F.

That is, even if the foreign substance F enters the gap at the time of the measurement, the foreign substance F does not adhere to the gap, and hence the influences of the foreign substance F on the measurement performance can be suppressed.

Consequently, the surface roughness tester 100 can bear a long-term use.

(Second Embodiment)

Next, a second embodiment of the present invention will be described with priority given to the points different from those of the first embodiment. Incidentally, the configurations similar to those of the first embodiment are denoted by the same marks as those of the first embodiment, and their descriptions will be omitted.

Figure 6:
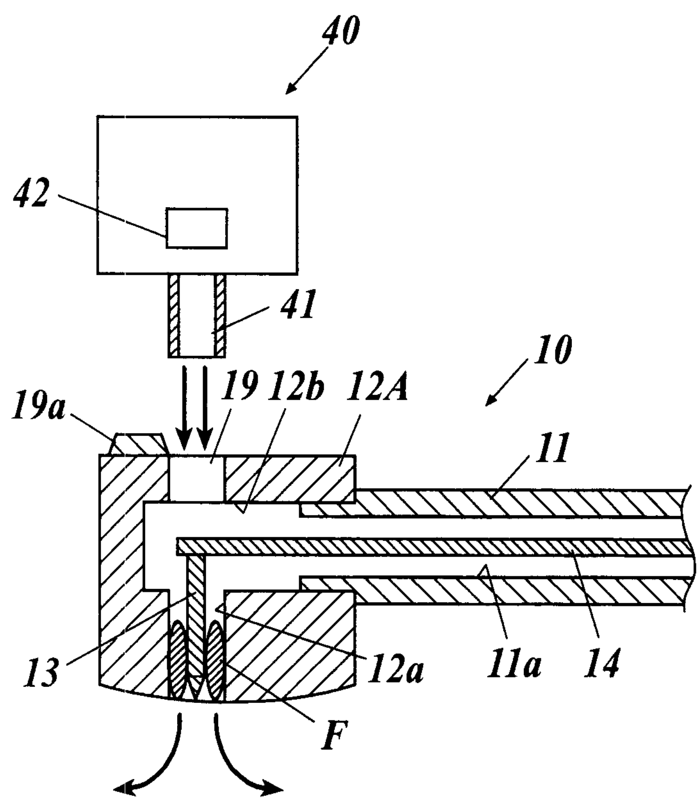
FIG. 6 is a schematic view of a foreign substance removing section of a second embodiment.

In the skid 12A of the present embodiment, as shown in FIG. 6, a compressed cleaning air intake 19 connected with the cavity 12*b* is formed at a position opposed to the skid aperture 12*a*.

Moreover, the foreign substance removing section of the present embodiment is an air jetting device 40 to remove the foreign substance F existing in the gap between the skid aperture 12*a* and the stylus 13 by jetting compressed air for cleaning to the gap as shown in FIG. 6.

To put it concretely, the air jetting device 40 includes a nozzle-shaped air jetting section 41 to jet compressed air for cleaning downward, a pressure adjusting valve 42 to adjust the air pressure of the air jetted from the air jetting section 41.

The air jetting section 41 is arranged just above the compressed cleaning air intake 19 of the skid 12A and jets compressed air for cleaning to the stylus 13 from the upper side of the stylus 13 to the lower side thereof through the compressed cleaning air intake 19. The air jetting section 41 thereby removes the foreign substance F. At this time, the air pressure is suitably adjusted by the pressure adjusting valve 42 in accordance with the quantity and the like of the foreign substance F.

Incidentally, a high-pressure gas cylinder (not shown) may be annexed to the air jetting device 40 to jet high-pressure gas in place of the compressed air. For example, an inert gas such as a nitrogen gas is here used as the high-pressure gas.

Consequently, in the present embodiment, after measurement of an object by the surface roughness tester 100 ends, the air jetting device 40 is installed in such a way that the air jetting section 41 of the air jetting device 40 is situated just above the compressed cleaning air intake 19 of the skid 12A at the setting process (S1).

Incidentally, the setting process (S1) may automatically be performed after measurement, or may manually be performed by an operator.

Moreover, at the removing process (S2), in the state in which the air jetting section 41 of the air jetting device 40 is situated just above the compressed cleaning air intake 19 of the skid 12A, the air jetting device 40 is operated to jet compressed air for cleaning from above to the gap between the skid aperture 12*a* and the stylus 13. At this time, the foreign substance F existing in the gap is blown away by the air pressure of the compressed air for cleaning.

As described above, according to the method for cleaning a skid of the present embodiment, it is needless to say that effects similar to those of the first embodiment can be obtained. Furthermore, because the air jetting device 40 blows compressed air for cleaning upon the skid 12A to remove the foreign substance F, the skid 12A can easily be cleaned.

Incidentally, a cover 19*a* capable of opening and closing the compressed cleaning air intake 19 maybe provided to the skid 12A, and the skid 12A may be configured to close the compressed cleaning air intake 19 with the cover 19*a* except for the time of performing the skid cleaning processing. Providing the cover 19*a* can prevent unnecessary dust and the like from entering the skid aperture 12*a*.

(Third Embodiment)

Next, a third embodiment of the present invention will be described with priority given to the points different from those of the first embodiment. Incidentally, the configurations similar to those of the first embodiment will be denoted by the same marks as those of the first embodiment, and their descriptions will be omitted.

Figure 7:
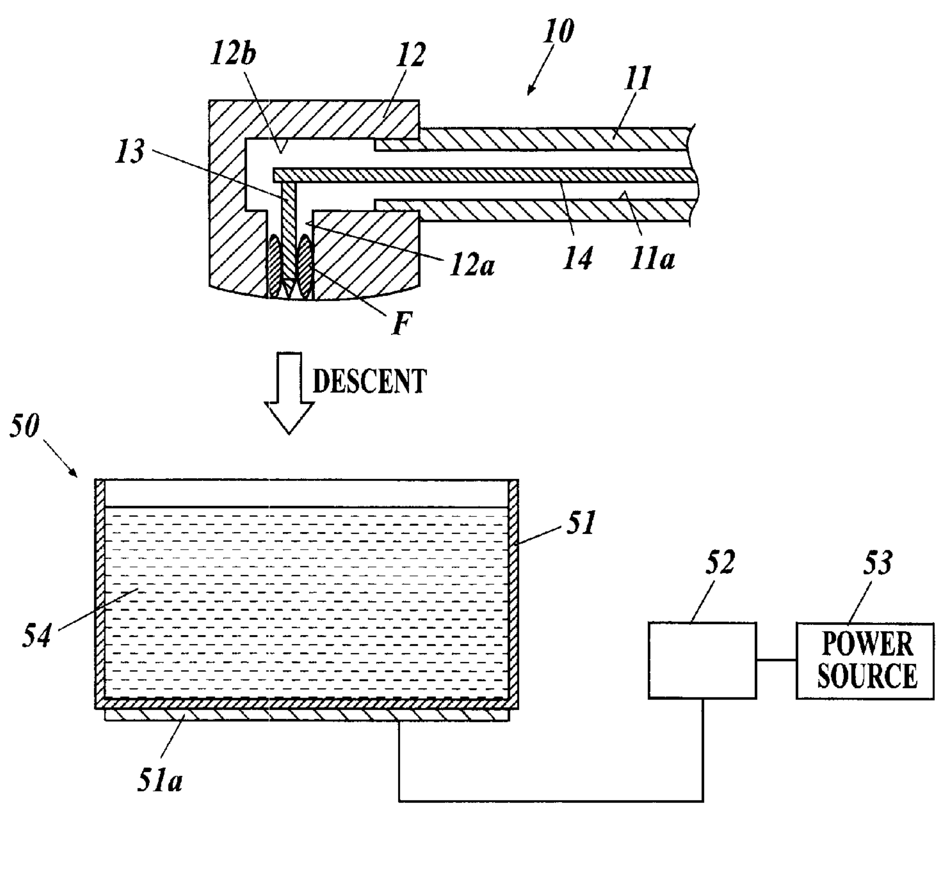
FIG. 7 is a schematic view of the foreign substance removing section of a third embodiment.
Figure 8:
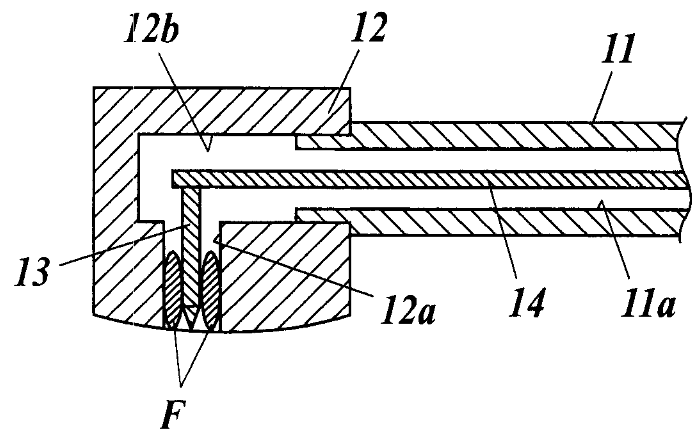
FIG. 8 is a view for describing a problem of a conventional surface roughness tester.

The foreign substance removing section of the present embodiment is an ultrasonic wave cleaning device 50 transmitting an ultrasonic wave to the gap through a cleaning fluid 54 to remove the foreign substance F existing in the gap between the skid aperture 12*a* and the stylus 13 as shown in FIG. 7.

To put it concretely, the ultrasonic wave cleaning device 50 includes a cleaning tank 51 for pooling the cleaning fluid (ultrasonic wave cleaning fluid) 54, an ultrasonic wave oscillator 52 to oscillate an ultrasonic wave, and a power source 53 to supply electric power to the ultrasonic wave oscillator 52.

The cleaning tank 51 is equipped with a vibrator 51*a*. The vibrator 51*a* converts electric vibrations generated by the ultrasonic wave oscillator 52 into mechanical vibrations to be transmitted to the cleaning fluid 54 in the cleaning tank 51.

When the skid 12 is soaked in the cleaning fluid 54 in the cleaning tank 51, the ultrasonic wave oscillator 52 oscillates electric vibrations of 20,000 Hz or more, and the vibrator 51*a* converts the electric vibrations to mechanically vibrattions so as to oscillate an ultrasonic wave. Then, the ultrasonic wave cleaning device 50 transmits the oscillated ultrasonic wave to the skid 12 through the cleaning fluid 54 to remove the foreign substance F.

Incidentally, as the cleaning fluid 54, for example, pure water, an organic solvent (such as acetone, benzine, or trichloroethylene) or the like is used.

Consequently, in the present embodiment, at the setting process (S1), after measurement of an object by the surface roughness tester 100 has ended, the ultrasonic wave cleaning device 50 is installed in such a way that the skid 12 is situated above the cleaning tank 51.

Incidentally, the setting process (S1) may automatically be performed after measurement, or may manually be performed by an operator.

Moreover, at the removing process (S2), the ultrasonic wave cleaning device 50 is operated to execute the ultrasonic wave cleaning in the state in which the skid 12 has descended to be soaked in the cleaning fluid 54 in the cleaning tank 51. Then, an ultrasonic wave is transmitted to the skid 12 to remove a foreign substance F, and thereby the skid 12 can be cleaned. Incidentally, after the ultrasonic wave cleaning, the skid 12 is pulled up from the cleaning tank 51.

As described above, according to the present embodiment, it is needless to say that the effects similar to those of the first and the second embodiments can be obtained. Moreover, because the cleaning is performed by the ultrasonic wave cleaning device 50, high cleaning effects can be obtained independent of the kind of the foreign substance F.

Incidentally, although the suction device 30, the air jetting device 40, and the ultrasonic wave cleaning device 50 have been illustrated to be described as the examples of the foreign substance removing section in the first to the third embodiments, respectively, two types or all types of those ones may be provided as the foreign substance removing section.

For example, after suctioning the under surface of the skid by the suction device 30, transmitting an ultrasonic wave to the skid by the ultrasonic wave cleaning device 50 may be performed. Alternatively, after suctioning the under surface of the skid by the suction device 30 and jetting the compressed air by the air jetting device 40, transmitting an ultrasonic wave to the skid by the ultrasonic wave cleaning device 50 may further be performed.

By configuring the foreign substance removing section in such ways, higher cleaning effects can be obtained, and the foreign substance F can more surely be removed.

The entire disclosure of Japanese Patent Application No. 2010-162437 filed on Jul. 20, 2010 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A method for cleaning a skid of a surface roughness tester including the skid provided with a skid aperture in a vertical direction, and a stylus disposed in the skid aperture of the skid and capable of moving in the vertical direction, wherein the surface roughness tester measures surface roughness of an object by moving the skid along a surface of the object, the method comprising:

attaching a suction pad to an under surface of the skid aperture and an end of the stylus;

sucking air out of the skid through the skid aperture and the suction pad; and sucking out a solid foreign substance existing in a gap between the skid aperture and the stylus so that the solid foreign substance remains on the suction pad and sucking out a fluid foreign substance existing in the gap through the suction pad, thereby removing the solid and fluid foreign substances existing in the gap after measuring the surface roughness of the object.

2. The method according to claim 1, further comprising:

immersing the skid into a cleaning fluid;

transmitting an ultrasonic wave to the gap between the skid aperture and the stylus through the cleaning fluid; and removing a foreign substance existing in the gap by the ultrasonic wave after measuring the surface roughness of the object.

* * * * *